United States Patent
Glemser et al.

(10) Patent No.: US 6,958,139 B1
(45) Date of Patent: Oct. 25, 2005

(54) ACTIVE MATERIAL FOR RECHARGEABLE BATTERIES

(75) Inventors: Oskar Glemser, Göttingen (DE); Sven Albrecht, Goslar (DE)

(73) Assignee: H.C. Starck GmbH & Co. KG, Goslar (DE)

(*) Notice: Subject to any disclaimer, the term of this patent is extended or adjusted under 35 U.S.C. 154(b) by 0 days.

(21) Appl. No.: 09/718,271

(22) Filed: Nov. 22, 2000

(30) Foreign Application Priority Data

Nov. 29, 1999 (DE) .................. 199 57 456

(51) Int. Cl.$^7$ ............... C01G 53/04; H01M 4/32; H01M 4/52
(52) U.S. Cl. ................. 423/594.19; 429/223
(58) Field of Search .............. 423/592, 594, 423/592.1, 594.3, 594.19; 429/218.1, 223; 49/223

(56) References Cited

U.S. PATENT DOCUMENTS

| | | | | |
|---|---|---|---|---|
| 4,696,875 A | * | 9/1987 | Glemser et al. ......... | 252/182.1 |
| 5,523,182 A | * | 6/1996 | Ovshinsky et al. ...... | 429/223 |
| 5,660,952 A | | 8/1997 | Yano et al. ............. | 429/223 |
| 5,670,271 A | * | 9/1997 | Axmann .................. | 423/140 |
| 5,700,596 A | * | 12/1997 | Ikoma et al. ............ | 429/206 |
| 5,773,169 A | * | 6/1998 | Matsuda et al. ......... | 429/223 |
| 5,827,494 A | | 10/1998 | Yano et al. ............. | 423/594 |
| 6,042,753 A | * | 3/2000 | Izumi et al. ............ | 252/521.2 |
| 6,193,871 B1 | * | 2/2001 | Coates et al. ........... | 205/170 |
| 6,576,368 B1 | * | 6/2003 | Ogasawara et al. ..... | 429/223 |

FOREIGN PATENT DOCUMENTS

| | | | | |
|---|---|---|---|---|
| EP | 0 908 962 A1 | * | 4/1999 | ........ H01M 4/52 |
| JP | 05182663 A | * | 7/1993 | ........ H01M 4/52 |
| WO | WO 00/14818 | * | 3/2000 | ........ H01M 4/32 |

OTHER PUBLICATIONS

Martin et al. "Alpha Nickel vs. Betal Nickel" Ju. 14, 1999.*
Axmann et al. "Nickel hydroxide as a matrix for unusual valencies: the electrochemical behaviour of metal(III)-ion-substituted nickel hydroxides of the pyroaurite type", Journal of Alloys and Compounds 246 (1997), pp. 232-241.*

* cited by examiner

Primary Examiner—Gregg Cantelmo
(74) Attorney, Agent, or Firm—Joseph C. Gil; James R. Franks

(57) ABSTRACT

A mixed metal hydroxide with brucite structure is described, which contains nickel hydroxide as its main component and at least one trivalent metal selected from the group consisting of Co, Fe, Al, Ga, In, Sc, Y and La in an amount of from about 12 to about 30 atom % relative to the sum of the metal components including Ni. The invention also relates to a rechargeable battery containing a mixed metal hydroxide according to the invention as an electrochemically active material as well as a secondary batter containing the mixed metal hydroxide. The invention also relates to a process for producing a mixed metal hydroxide having a brucite structure.

10 Claims, 3 Drawing Sheets

ACTIVE MATERIAL FOR RECHARGEABLE BATTERIES

FIELD OF THE INVENTION

The present invention relates to an active material for rechargeable batteries, in particular a metal(III) ion-substituted nickel hydroxide with brucite-type structure, a process for the production thereof and use thereof as an electrode material for secondary batteries.

BACKGROUND OF THE INVENTION

Nickel hydroxide is used as a cathode material for alkaline secondary batteries such as nickel/cadmium or nickel/metal hydride batteries. An electrochemical variable crucial for industrial use is capacity per unit mass. It is a function of the nickel content of the nickel hydroxide and of nickel utilization. The interrelationship between capacity per unit mass Q in mAh/g, the nickel content in wt. % of the cathode material and nickel utilization in % EES (one-electron step) is obtained as follows:

$$Q = \frac{\text{wt. \% Ni} \cdot \text{\% EES} \cdot F}{58.69 \cdot 3600 \cdot 10} \text{[mAh/g]}$$

wherein
F=Faraday constant=$96487^{A \cdot s/mol}$
58.69=Molar mass of nickel, g/mol
3600=factor for converting seconds into hours
10=factor for converting % into ratio figures and mA into A.

This provides a theoretical capacity per unit mass at 100% EES of 289 mAh/g. Nickel hydroxides suitable for industrial use, however, comprise modification metal contents of between 4 and 6% and 1 to 2% water relative to the total metal content, such that, in the case of 100% nickel utilization, these comprise a capacity per unit mass of only 252 to 266 mAh/g. The 100% nickel utilization of this nickel hydroxide is associated with the 1-electron step (and 1-proton step) per nickel atom which occurs on conversion of $\beta\text{-Ni}^{(II)}(OH)_2$ into $\beta\text{-Ni}^{(III)}OOH$ during battery charging.

Overcharging of the battery results in further deprotonation and oxidation of some of the nickel into $Ni^{(VI)}$, i.e., in the formation of $\gamma$-NiOOH. For charge compensation, water molecules and alkali ions are incorporated in intermediate layers. Formation of $\gamma$-NiOOH is consequently associated with an expansion of the nickel layer spacing in the lattice. Discharging of the $\gamma$-NiOOH proceeds by release of alkali ions into the electrolyte, wherein $\alpha\text{-Ni}(OH)_2$ forms. The $\alpha$-$\gamma$ transition is theoretically provided with a 1.67-electron step, e.g. 167% EES. However, this 1.67-electron step cannot be used industrially, since the $\alpha\text{-Ni}(OH)_2$ in the alkaline electrolyte is unstable and is converted by ageing into $\beta\text{-Ni}(OH)_2$, with reformation of the volume increase which occurred during the $\beta$-NiOOH-$\gamma$-NiOOH transition.

By introducing trivalent metals into nickel hydroxide it is possible to stabilize the a structure (pyroaurite). However, in the case of a pyroaurite structure, anions and water molecules are incorporated between the nickel hydroxide layers to ensure charge neutrality, such that the lattice is expanded. Although it is possible to achieve a stable 1.5-electron step per nickel atom in the case of such nickel hydroxides with pyroaurite structure modified by trivalent ions, the storage density is reduced on the one hand by the electrochemically inactive trivalent ions and on the other hand by the incorporated anions and water molecules.

SUMMARY OF THE INVENTION

It has now been found that it is possible, by suspending the pyroaurite nickel hydroxide, modified with trivalent ions, in alkali solution, performing separation from the alkali solution and drying with the alkali solution which still remains, to convert the pyroaurite structure into a brucite-type structure while retaining the 1.67-electron step. In the process, intermediate layer anions and water are removed from the lattice, such that the layer spacing is reduced, while the storage density is increased.

The invention relates to a mixed metal hydroxide, with a brucite structure, containing (a) a nickel hydroxide component; and (b) at least one trivalent metal selected from the group consisting of Co, Fe, Al, Ga, In, Sc, Y and La in an amount ranging from about 12 to about 30 atom % relative to the sum of the metal components including Ni. The invention also relates to a rechargeable battery containing a mixed metal hydroxide according to the invention as an electrochemically active material as well as a secondary battery containing the mixed metal hydroxide. The invention also relates to a process for producing a mixed metal hydroxide having a brucite structure.

BRIEF DESCRIPTION OF THE DRAWINGS

These and other features, aspects, and advantages of the present invention will become better understood with reference to the following description and appended claims, where FIG. 1 explains, in an idealized representation, the electron transitions achievable with the various nickel hydroxides. The top four structures show the Bode diagram known per se.

DETAILED DESCRIPTION OF THE INVENTION

Figure 1:
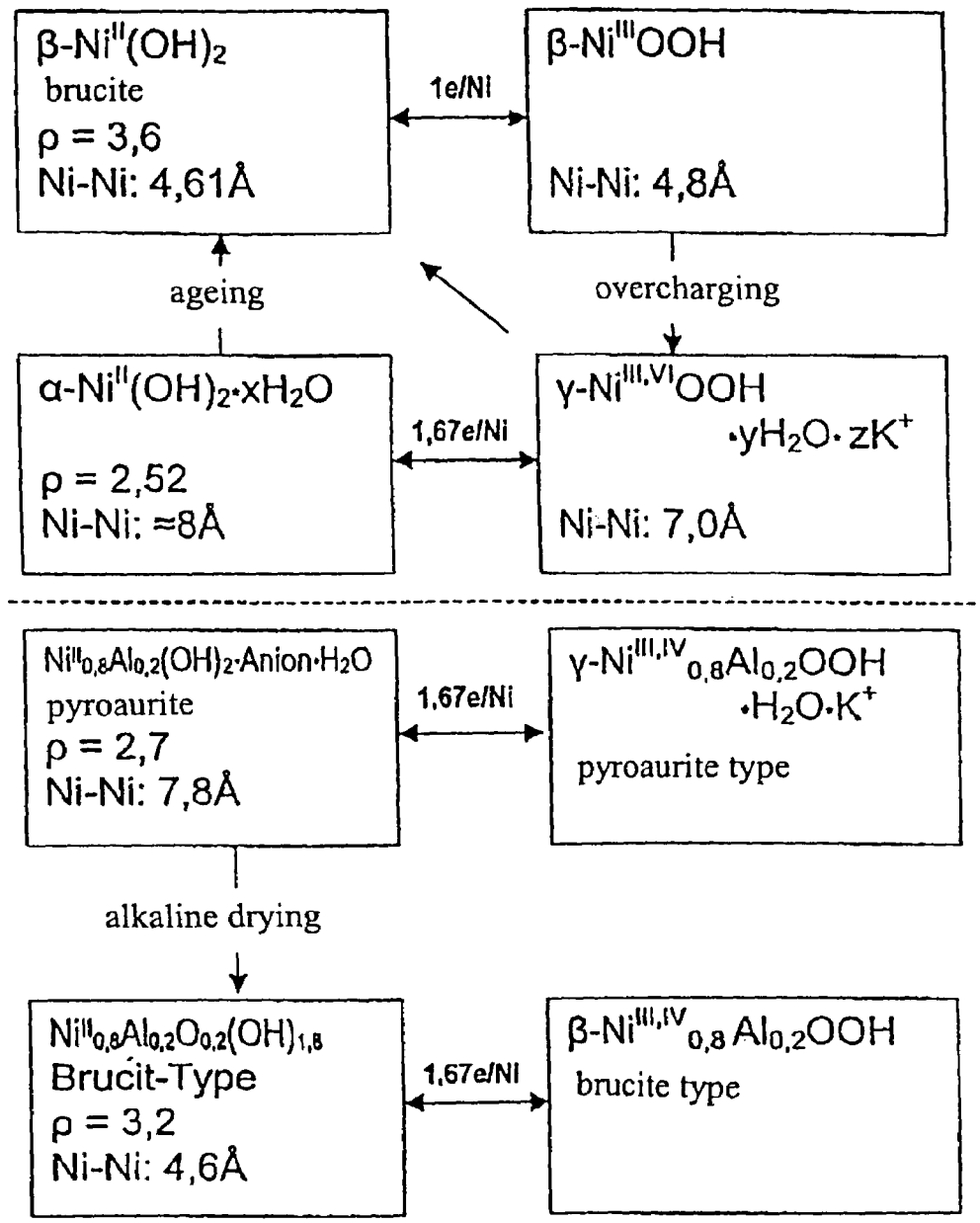

The trivalent metal is preferably present in an amount of from about 12 to about 25 atom %, relative to the sum of all the metal components. Preferred trivalent metals are Co, Fe and Al, Al being particularly preferred.

Particularly preferred mixed metal hydroxides with brucite structure according to the invention contain, in addition to the above-mentioned first group of trivalent metals, at least one of the elements Co, Fe, Mn, Cr, Ti, Zr and Cu, wherein the element from this second group is different from the trivalent metal of the first group and replaces the trivalent metal from the first group in a positive amount of up to about 40 atom %. In one embodiment, a mixed metal hydroxide additionally contains at least one of the elements Co, Fe, Mn, Cr, Ti, Zr or Cu which is different from the trivalent metal mentioned above, in a positive amount of up 15% relative to the sum of all the metal components.

Preferred mixed metal hydroxides according to the invention contain Al and Co, wherein the atomic ratio of Al to Co amounts to from 2 to 4, particularly preferably from 2.5 to 3.5. In one embodiment, a mixed metal hydroxide in accordance with the invention contains 4 to 9 atom % Co.

The mixed metal hydroxides according to the invention are additionally determined by a layer spacing of 4.3 to 4.8 Å determined by X-ray diffraction. The reflection diverges to the smaller angle θ owing to a shoulder corresponding to a lattice spacing of from 5.2 to 5.7 Å.

The invention further provides a process for producing the mixed hydroxides according to the invention by co-precipitation of mixed hydroxides with pyroaurite structure from corresponding metal salt solutions, suspension of the precipitation product in alkali solution, separation from the alkali solution and drying in the presence of the entrained alkali solution. An at least 0.5 molar alkali metal hydroxide solution is preferably used.

An at least 0.9 molar alkali metal hydroxide solution is preferably used for alkaline drying, particularly preferably an at least 1 molar alkali metal hydroxide solution. The preferred alkali metal hydroxide is sodium hydroxide.

Production of the mixed hydroxides with pyroaurite structure proceeds by production of an aqueous-solution-by-dissolving-appropriate water-soluble metal salts of the metal components in the desired ratio and performing precipitation from the solution by adjusting the pH value to 10 to 13 by adding alkali metal hydroxide solutions. The process may be performed discontinuously or continuously by simultaneously supplying metal salt solution and alkali metal hydroxide solution to a reaction vessel with continuous withdrawal of the precipitation suspension. Suitable metal salts are halides (preferably fluorides or chlorides), carbonates, sulfates, nitrates, acetates, oxalates, borates and/or phosphates, provided that these exhibit sufficient solubility.

In order to oxidize divalent modification metal ions optionally present in the precipitation suspension into the trivalent stage, it may additionally be expedient to add oxidation agents to the precipitation suspension, such as, for example oxygen, $H_2O_2$, hypochlorite or peroxodisulfates.

Ammonium hydroxide, lithium hydroxide, potassium hydroxide or sodium hydroxide are suitable alkali solutions for performing precipitation. Sodium hydroxide is preferred.

It may additionally be expedient, after precipitation, initially to exchange the anions of the pyroaurite structure incorporated into the mixed metal hydroxide for carbonate ions. This may be performed by treating the precipitation product with alkali carbonate or alkali hydrogencarbonate solution.

After separation from the mother liquor and washing to remove residual mother liquor, the precipitation product is re-suspended in an alkali metal hydroxide solution preferably without intermediate drying. After separation from the alkali metal hydroxide solution, drying is performed carefully at temperatures below 80° C., in particular below 60° C., more preferably at reduced pressure. The lower is the pressure during drying, the higher should be the minimum concentration of the alkali metal hydroxide solution. For example, at a drying pressure of 10 mbar, an alkali metal hydroxide concentration of at least 1.3 molar is preferred.

The mixed-metal-hydroxides-with-brucite-structure-obtainable according to the invention are at the same time excellent starting materials for producing lithium mixed metal oxides. Lithium mixed metal oxides are produced in that the mixed metal hydroxides are mixed with suitable lithium compounds such as lithium hydroxide or lithium nitrate and the mixture is then fired at temperatures above 600° C.

The invention is further described in the following illustrative examples in which all parts and percentages are by weight unless otherwise indicated.

EXAMPLES a) Production

Co-precipitation of the substituted nickel hydroxides is performed by introducing the mixed metal salt solution dropwise into an initial mixture of constant pH value. The composition of the metal salt solution, the equalizing liquor and the initial mixture is described here in relation to the example of precipitation of 0.125 mol of a nickel hydroxide of the metal ion composition $Ni_4Al_{0.75}Co_{0.25}$ at a precipitation pH value of 12.5. The composition of the metal salt solution is modified appropriately for other metal ion compositions. With this batch size, approximately 10 g of dried hydroxide are obtained.

1. Salt solution: Total metal ion concentration 0.5 M
   26.28 g $NiSO_4 \cdot 6H_2O$ (=0.10 mol $Ni^{2+}$)
   12.48 g $Al_2(SO_4)_3 \cdot 18H_2O$ (=1.88·10$^{-2}$ mol $Al^{3+}$)
   1.76 g $CoSO_4 \cdot 7H_2O$ (=6.25·10$^{-3}$ mol $Co^{2+}$)
   demineralized water to make up to 250 ml
2. Equalizing liquor: Hydroxide ion concentration 1.0 M
   10 g NaOH pellets (99.5%)
   demineralized water to make up to 250 ml
3. Initial liquor: Carbonate ion concentration 0.5 M
   26.50 g $Na_2CO_3$
   demineralized water to make up to 500 ml
   prior to start of precipitation, dropwise addition of 8M NaOH to pH 12.5

The initial mixture is thermostatted to a temperature of 34° C. prior to precipitation. During precipitation, the pH value is measured and kept constant by variation of the equalizing liquor addition rate. The stirring speed during precipitation amounts to 300 rev/min.

The salt solution is added to the initial mixture at a speed of 5 ml/minute using diaphragm pumps and the pH value is kept constant at 12.5 by the addition of the equalizing liquor.

After completion of precipitation, the precipitate is allowed to age for 18 hours at room temperature without stirring.

The precipitate is centrifuged off for 10 minutes at 6000 rev/min, the remaining liquor is discarded and the product is suspended using a stirring apparatus in a liter of washing liquor (NaOH) of precipitation pH at room temperature for approx. 3 minutes and then centrifuged off again. This process is repeated until the anion to be washed out can no longer be detected.

Figure 2:
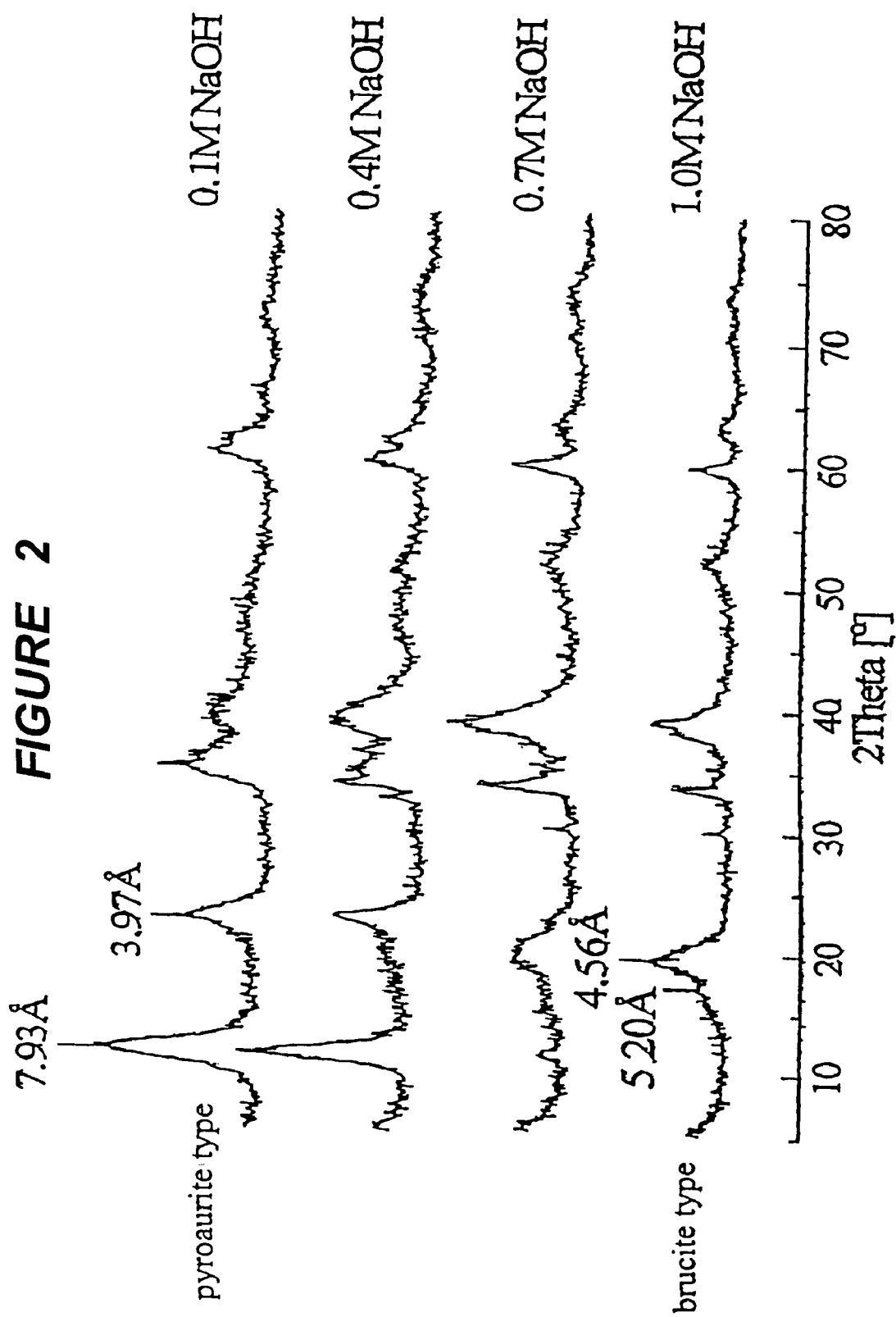
FIG. 2 shows X-ray diffraction spectra of mixed hydroxides dried alkalinely in sodium hydroxide solution of various concentrations, according to the Examples.
Figure 3:
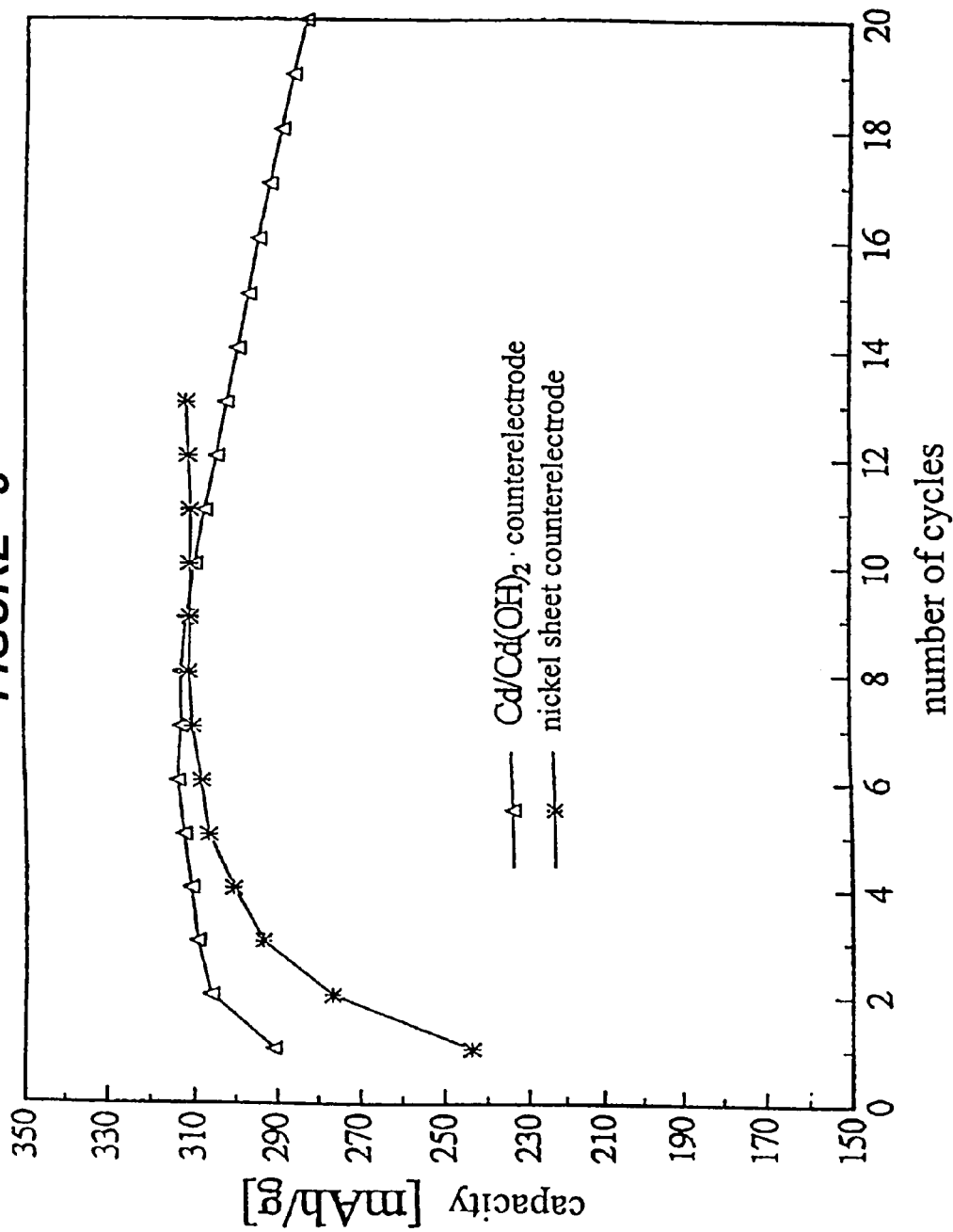
FIG. 3 shows the discharge capacity of the mixed hydroxide of the brucite type as a function of the cycle number according to Examples.

After the last centrifugation, the washed gel is suspended in 200 ml of sodium hydroxide solution of a given concentration according to Table 1, stirred for an hour, centrifuged and dried with the residual attached liquor at 50° C. in a water-jet vacuum. This procedure is here designated alkaline drying. In the products, the degree of conversion increases with the hydroxide ion concentration of the suspension liquor used (FIG. 2). Thus, after drying, a pyroaurite type is obtained from 0.03 molar and 0.1 molar liquor, while a spectrum with low brucite content is obtained from 0.4 molar liquor. During drying from 0.7 molar liquor, conversion into the brucite type is virtually complete. The ratio of metal ions to one another does not vary through this treatment. Thus, no aluminium is dissolved out of the substance by alkaline drying.

The brucite type obtained differs from the conventional brucite type in that the 001 reflection is shifted somewhat to smaller d values of 4.56 Å instead of 4.63 Å. In addition, a small shoulder of the 001 reflection arises in the area of 5.20 Å, which indicates a partial expansion of the layer spacing relative to the normal brucite type. With a pure nickel hydroxide, these deviations from the known brucite structure are not found after alkaline drying, the 001 peak is at 4.63 Å and there is no shoulder at higher d values.

The nickel content of the $Ni_4Al_{0.75}Co_{0.25}$ hydroxides increases with an increasing brucite structure proportion (Table 1), as does the pycnometric density.

TABLE 1

Analysis values for $Ni_4Al_{0.75}Co_{0.25}$ hydroxides with pyroaurite structure (top) and brucite structure (bottom)

| Drying liquor for $Ni_4Al_{0.75}Co_{0.25}$ | Nickel content | Nickel: carbon ratio | Nickel: hydrogen ratio | Pycnometric density |
|---|---|---|---|---|
| 0.03 M (pH 12.5) | 45.03% | 1:0.138 | 1:3.85 | 2.65 g/cm³ |
| 0.7 M | 46.66% | 1:0.076 | 1:3.71 | 3.05 g/cm³ |
| 1.0 M | 49.16% | 1:0.071 | 1:3.58 | 3.21 g/cm³ |

In pyroaurite-type nickel hydroxides, the hydroxide layers have a positive charge owing to the partial substitution with trivalent cations ($Al^{3+}$, $Co^{3+}$ or $Fe^{3+}$). Because of the necessary charge equalization by carbonate ions or other anions, the spacing of the hydroxide layers from one another is widened to 7.8 Å. In addition, water molecules are located in the intermediate layer. In order to achieve conversion to the brucite structure, the positive charge of the hydroxide layers must be dissipated.

Partial deprotonation of the hydroxide ions is adopted as the mechanism for dissipating the main layer charge. This process could proceed according to the following program:
1. One hydroxide group of the main layer is deprotonated per metal(III) ion.
2. The positive main layer charge is dissipated by the removal of $H^+$ ions.
3. The negative intermediate layer of water molecules and carbonate ions is then no longer necessary for the electron neutrality of the structure and may depart.
4. The layer spacing reduces from 7.8 Å to 4.6 Å.

The completely converted product (drying from 1.0M NaOH) has a pycnometric density of 3.21 g/cm³. A pure nickel(II) hydroxide produced according to the same precipitation parameters has a pycnometric density of 3.57 g/cm³. If 17.65% of the nickel ions in this pure nickel hydroxide are replaced, according to the formula $Ni_4Al_{0.75}Co_{0.25}$, by lighter aluminium ions, a density of 3.23 g/cm³ may be obtained by calculation, which corresponds well with the measured value of 3.21 g/cm³.

b) Examination of Cycle Behavior

To test electrochemical properties, galvanostatic charging and discharging was performed. 10 M KOH served as the electrolyte. 100 mg of the active material were mixed with 50 mg of graphite and 3 mg of PTFE powder, ground to a dry paste and incorporated into nickel foam. Forming proceeds for 14 hours at 5 mA and further charging for 12 hours at the same current strength. Discharging was performed with a current of 2.5 mA to a cut-off voltage of 0.9 V against $Cd/Cd(OH_2)$ or 0V against $Hg/HgO$. During cycling in 10 M KOH of the $Ni_4Al_{0.75}Co_{0.25}$ brucite produced by drying from 0.7 M NaOH, maximum nickel utilization is over 147%. This corresponds to a maximum capacity per unit mass of 313 m Ah/g (FIG. 2). The nickel content of this material amounts to 46.7%.

At 147%, maximum nickel utilization of the $Ni_4Al_{0.75}Co_{0.25}$ brucite type is of a value similar to that of 144% for an $Ni_4Al_{0.75}Co_{0.25}$ pyroaurite. However, since the nickel content of the brucite type is, at 46.7%, 6.1% higher than that of the pyroaurite type, at 44.0%, the capacity per unit mass thereof is higher, at 310 mAh/g, than that of the pyroaurite type, at 290 mAh/g.

Although the present invention has been described in detail with reference to certain preferred versions thereof, other variations are possible. Therefore, the spirit and scope of the appended claims should not be limited to the description of the versions contained therein.

What is claimed is:

1. A mixed metal hydroxide, with a brucite structure, comprising:
   (a) a nickel hydroxide component; and
   (b) a trivalent metal consisting of
      (i) a first metal selected from the group consisting of Fe, Al and combinations thereof, and
      (ii) optionally a second metal selected from the group consisting of Co, Ga, In, Sc, Y, La and combinations thereof,
   said trivalent metal being present in an amount ranging from 12 to 30 atom % relative to the sum of the metal components including Ni,
   wherein the mixed metal hydroxide has a brucite structure and a nickel layer spacing determinable by X-ray diffraction, that ranges from 4.3 Å to 4.8 Å.

2. The mixed metal hydroxide of claim 1, wherein the mixed metal hydroxide contains from 12 to 25 atom % Al.

3. The mixed metal hydroxide of claim 1, wherein said second metal (b)(ii) is present and is Co, the mixed metal hydroxide containing from 4 to 9 atom % Co.

4. A rechargeable battery comprising the mixed metal hydroxide of claim 1 as an electrochemically active material.

5. A secondary battery comprising the mixed metal hydroxide of claim 1.

6. The mixed metal hydroxide of claim 1 wherein said trivalent metal (b) consists of Al and Co with an atomic ratio of Al to Co of 2 to 4.

7. A mixed metal hydroxide comprising:
   (a) a nickel hydroxide component; and
   (b) a trivalent metal consisting of
      (i) a first metal selected from the group consisting of Fe, Al and combinations thereof, and
      (i) optionally a second metal selected from the group consisting of Co, Ga, In, Sc, Y, La and combinations thereof,
   the trivalent metal being present in an amount ranging from 12 to 20 atom % relative to the sum of the metal components including Ni,
   wherein the mixed metal hydroxide further comprises at least one element selected from the group consisting of Mn, Cr, Ti, Zr and Cu, in which the at least one element is different from the trivalent metal, the at least one element being present in a positive amount of up to 15 atom %, relative to the sum of all metal components,
   further wherein the mixed metal hydroxide has a brucite structure and a nickel layer spacing, determinable by X-ray diffraction, that ranges from 4.3 Å to 4.8 Å.

8. A rechargeable battery comprising the mixed metal hydroxide of claim 7 as an electrochemically active material.

9. A secondary battery comprising the mixed metal hydroxide of claim 7.

10. The mixed metal hydroxide of claim 7 wherein said trivalent metal (b) consists of Al and Co with an atomic ratio of Al to Co of 2 to 4.

* * * * *